(12) United States Patent
Kim et al.

(10) Patent No.: US 10,140,439 B2
(45) Date of Patent: Nov. 27, 2018

(54) SECURITY CARD HAVING FINGERPRINT AUTHENTICATION, PROCESSING SYSTEM AND PROCESSING METHOD THEREFOR

(71) Applicants: Jung Taek Kim, Seoul (KR); Young Dai Gwun, Uijeongbu-si (KR); Hyun Kil Choi, Seoul (KR)

(72) Inventors: Jung Taek Kim, Seoul (KR); Young Dai Gwun, Uijeongbu-si (KR)

(73) Assignees: Jung Taek Kim, Seoul (KR); Young Dai Gwun, Uijeongbu-si (KR); Hyun Kil Choi, Seoul (KR)

( * ) Notice: Subject to any disclaimer, the term of this patent is extended or adjusted under 35 U.S.C. 154(b) by 227 days.

(21) Appl. No.: 15/029,884

(22) PCT Filed: Oct. 15, 2014

(86) PCT No.: PCT/KR2014/009693
§ 371 (c)(1),
(2) Date: Apr. 15, 2016

(87) PCT Pub. No.: WO2015/056979
PCT Pub. Date: Apr. 23, 2015

(65) Prior Publication Data
US 2016/0246954 A1    Aug. 25, 2016

(30) Foreign Application Priority Data
Oct. 15, 2013  (KR) .................. 10-2013-0122946

(51) Int. Cl.
*G06F 21/32* (2013.01)
*G06K 9/00* (2006.01)
(Continued)

(52) U.S. Cl.
CPC .............. *G06F 21/32* (2013.01); *G06F 21/34* (2013.01); *G06F 21/6245* (2013.01);
(Continued)

(58) Field of Classification Search
CPC combination set(s) only.
See application file for complete search history.

(56) References Cited

U.S. PATENT DOCUMENTS 5,592,400 A * 1/1997 Sasou .................. G06Q 20/341
235/375
5,883,452 A * 3/1999 Masuda ............... G06Q 20/342
235/375
(Continued)

FOREIGN PATENT DOCUMENTS

JP    11-338985 A    12/1999
JP    2002-312732 A    10/2002
(Continued)

OTHER PUBLICATIONS

Japanese Office Action dated Apr. 18, 2017 in counterpart Japanese Patent Application No. 2016-524439 (3 pages in Japanese).
(Continued)

*Primary Examiner* — Phy Anh Vu
(74) *Attorney, Agent, or Firm* — NSIP Law (57) ABSTRACT

The present invention relates to a security card processing system and method, and more particularly, to a security card system and method wherein a security card is activated and security information stored in the security card is externally transmitted only when the card owner's fingerprint is authenticated using a fingerprint sensor built into the security card, thereby protecting against unauthorized use by other people. According to the present invention, unauthorized use of the security card by other people can be prevented and also security information of the owner of the security card can be protected from leaking since the security card is activated and the security information stored in the security card is externally transmitted only when the card
(Continued)

owner's fingerprint is authenticated using a fingerprint sensor built into the security card.

5 Claims, 9 Drawing Sheets (51) Int. Cl.
*G06F 21/34* (2013.01)
*G06F 21/62* (2013.01)

(52) U.S. Cl.
CPC ..... *G06K 9/00006* (2013.01); *G06K 9/00013* (2013.01); *G06K 2009/00959* (2013.01)

(56) References Cited

U.S. PATENT DOCUMENTS

| | | | | |
|---|---|---|---|---|
| 6,041,410 | A * | 3/2000 | Hsu | G06K 9/00013 380/285 |
| 6,929,413 | B2 * | 8/2005 | Schofield | B42D 25/00 235/380 |
| 2002/0087869 | A1 * | 7/2002 | Kim | G06Q 20/341 713/186 |
| 2002/0088852 | A1 * | 7/2002 | Ohta | G06Q 20/045 235/381 |
| 2002/0095588 | A1 * | 7/2002 | Shigematsu | G06Q 20/367 713/186 |
| 2003/0070079 | A1 | 4/2003 | Cromer et al. | |
| 2005/0229007 | A1 * | 10/2005 | Bolle | G06F 21/32 713/186 |
| 2006/0102717 | A1 * | 5/2006 | Wood | G06Q 10/10 235/382 |
| 2007/0061590 | A1 * | 3/2007 | Boye | G06F 21/305 713/186 |
| 2007/0186116 | A1 | 8/2007 | Clemmensen et al. | |
| 2007/0198435 | A1 * | 8/2007 | Siegal | G06F 21/32 705/67 |
| 2007/0277044 | A1 | 11/2007 | Graf et al. | |
| 2007/0291995 | A1 | 12/2007 | Rivera | |
| 2008/0120710 | A1 * | 5/2008 | Holz | G06K 7/10346 726/7 |
| 2008/0282334 | A1 * | 11/2008 | Yves | G06Q 20/341 726/9 |
| 2009/0106563 | A1 * | 4/2009 | Cherpantier | G06F 21/86 713/194 |
| 2009/0189736 | A1 * | 7/2009 | Hayashi | G06F 21/32 340/5.81 |
| 2009/0313129 | A1 * | 12/2009 | Rothschild | G06Q 20/04 705/17 |
| 2010/0268961 | A1 * | 10/2010 | Cole | G06F 21/32 713/186 |
| 2010/0287369 | A1 * | 11/2010 | Monden | G06F 21/32 713/156 |
| 2011/0012711 | A1 * | 1/2011 | Abe | G06F 21/32 340/5.82 |
| 2011/0102141 | A1 * | 5/2011 | Wu | G06K 19/06187 340/5.82 |
| 2012/0188104 | A1 * | 7/2012 | Choi | G06Q 10/083 340/989 |
| 2012/0257797 | A1 * | 10/2012 | Leyvand | G06K 9/00221 382/118 |
| 2013/0182279 | A1 * | 7/2013 | Yano | H04N 1/00854 358/1.14 |
| 2016/0267262 | A1 * | 9/2016 | Taniguchi | G06F 21/32 |
| 2017/0048240 | A1 * | 2/2017 | Chang | H04L 63/0861 |
| 2017/0337542 | A1 * | 11/2017 | Kim | G06Q 20/3255 |

FOREIGN PATENT DOCUMENTS

| | | |
|---|---|---|
| JP | 2007-066008 A | 3/2007 |
| JP | 2011-090686 A | 5/2011 |
| KR | 10-2006-0125033 A | 12/2006 |

OTHER PUBLICATIONS

European Search Report dated Feb. 17, 2017 in counterpart European Application No. 14854792.0 (6 pages in English).

* cited by examiner

SECURITY CARD HAVING FINGERPRINT AUTHENTICATION, PROCESSING SYSTEM AND PROCESSING METHOD THEREFOR

CROSS-REFERENCE TO RELATED APPLICATIONS

This application is a National Stage of International Application No. PCT/KR2014/009693, filed Oct. 15, 2014 and published as WO 2015/056979 on Apr. 23, 2015, which claims the foreign priority benefit under 35 U.S.C. Section 119(a) of Korean Patent Application Serial No. 10-2013-0122946, filed on Oct. 15, 2013, the entire disclosures of which are incorporated herein by reference for all purposes.

TECHNICAL FIELD

The present invention relates to security cards that performs fingerprint authentication and systems and methods of processing the security cards, and more particularly, to a security card that performs fingerprint authentication, wherein the security card is activated and security information stored in the security card is externally transmitted only when the card owner's fingerprint is authenticated using a fingerprint sensor built into the security card, thereby protecting against unauthorized use by other people, and a system and method of processing the security card.

BACKGROUND ART

With computerization and developments in Internet technology, the number of accesses to financial data, medical data, and personal data is increasing, and data belonging to secret is being used as means for boosting illegal transactions that are updated or changed. To maintain confidentiality of this data, passwords are widely in use. However, passwords are usually based on birth dates or phone numbers that are not protected because they are relatively easily predicted or estimated.

Even complicate and randomly-generated passwords are relatively easy to be illegally used. Accordingly, data access systems based on passwords easily become a target for crime, and thus dangers and losses may be caused to the industry and business and even personal life. Therefore, an improved method for protecting data from unauthorized accesses is necessary. Examples of biometric data may include minute details (feature points of a fingerprint, etc.) difficult to be captured but easy to be analyzed, and an overall pattern (a spatial feature of adjacent fingerprint whorls, etc.) easy to be captured but difficult to be analyzed.

An encryption algorithm requires a digital key that can only be used by authorized users. If there are no appropriate keys, resources should be processed for a long time, and predetermined features of non-encrypted data should be ascertained (should be at least predicted), in order to decode encrypted data in a usable format.

A personal identification system has been disclosed, using an identification (ID) card including an integrated memory for registering encrypted biometric data acquired from a card owner. The biometric data is voiceprints, fingerprints, physical appearances, and/or biological assays. When a card is used, the personal identification system reads and decrypts data from the card and compares a result of the decryption with data acquired from the owner of the card. According to this system, registered persons are positively identified, and the accuracy of the identification is very high. However, since the biometric data is acquired and processed by external equipment, it is not easy to protect information stored in the card from falsification and/or identity theft.

In order to substantially protect biometric data stored in a card from unauthorized changes to the stored data by providing a hardware firewall of encrypting and separating the biometric data, an improved ID card equipped with a data-driven multi-processor chip has been proposed. However, since a substantial matching process is performed by an external read terminal for capturing biometric data, the biometric data is highly likely to be affected by external illegal manipulations.

DETAILED DESCRIPTION OF THE INVENTION

Technical Problem

The present invention provides a security card that performs fingerprint authentication, wherein the security card is activated and security information stored in the security card is externally transmitted only when the card owner's fingerprint is authenticated using a fingerprint sensor built into the security card, thereby protecting against unauthorized use by other people, and a system and method of processing the security card.

Advantageous Effects

According to the present invention, since a security card is activated and security information stored in the security card is externally transmitted only when the card owner's fingerprint is authenticated using a fingerprint sensor built into the security card, unauthorized use of the security card by other people can be prevented and also security information of the owner of the security card can be protected from leaking.

BEST MODE

The present invention provides a security card that performs fingerprint authentication, the security card including a fingerprint sensor configured to sense a fingerprint and generate fingerprint information; a memory configured to store reference fingerprint information in a security region and further store at least one of financial information for financial works, personal information, a personal identification number (PIN), and authority information in the security region; and a controller configured to provide information stored in the security region to the outside via an input/output interface or a radio frequency (RF) module only when the sensed fingerprint information is identical to the reference fingerprint information.

The present invention provides a security card processing system comprising the security card, a new issuing machine, and a management server. The new issuing machine receives new issuance information including personal information of a card-issued person and transmits the received new issuance information to the management server, receives issuance security information including first information corresponding to a first key value and second information corresponding to a second key value and transmits the issuance security information to the management server, and transmits an issuance permission signal and an issuance completion signal to the security card when receiving the issuance permission signal and the issuance completion signal from the management server. In response to the issuance permission signal, the security card stores a fingerprint sensed via the fingerprint sensor as reference fingerprint information in the security region, and transmits the reference fingerprint information to the management server via the new issuing machine, and in response to the issuance completion signal, the security card starts monitoring the security region, and discards the reference fingerprint information stored in the security region when a change in the security region is sensed. In response to the new issuance information, the management server generates and transmits the first key value to the new issuing machine, and generates and transmits the second key value to a card-issued person of the security card in an e-mail or text message format, and, when the first information and the second information included in the issuance security information are identical to the first key value and the second key value, the management server transmits the issuance permission signal, generates an issuance completion signal when receiving the reference fingerprint information, and transmits the issuance completion signal to the new issuing machine.

Mode of the Invention

As the invention allows for various changes and numerous embodiments, exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept.

While such terms as "first," "second," etc., may be used to describe various components, such components must not be limited to the above terms. The above terms are used only to distinguish one component from another. For example, a first component discussed below could be termed a second component, and similarly, a second component may be termed a first component without departing from the teachings of this disclosure.

The terms used in the present specification are merely used to describe particular embodiments, and are not intended to limit the scope of the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments will now be described more fully with reference to the accompanying drawings. Like numbers refer to like elements throughout.

Figure 1:
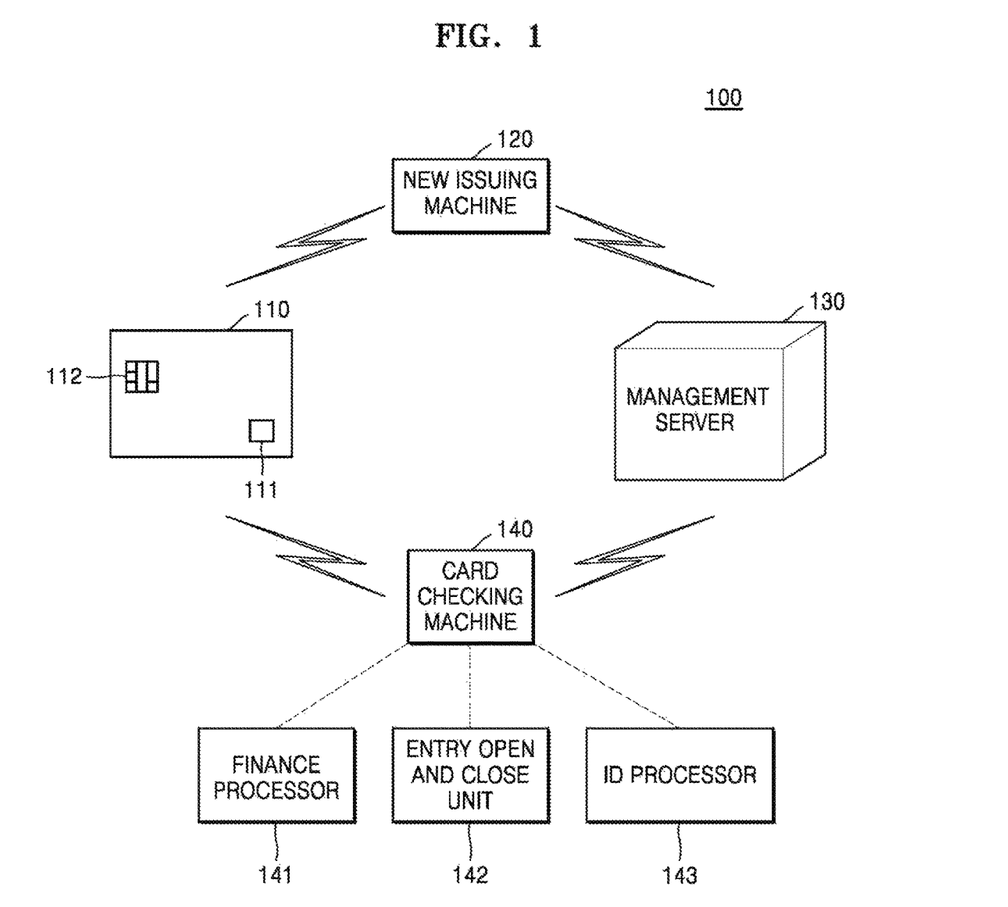
FIG. 1 illustrates a security processing system and a security processing method according to the present invention.

FIG. 1 illustrates a security processing system and a security processing method according to the present invention.

The present invention provides a security card that performs fingerprint authentication in which the security card can be used only when identification is confirmed via fingerprint recognition, and a system and method of processing the security card. The security card processing system according to the present invention includes a security card that performs fingerprint authentication, a new issuing machine that performs a new issuing procedure with respect to the security card, a card checking machine that performs an access permission procedure by checking the security card, and a management server that manages information about a user(e.g., card owner) and about the security card and processes the new issuing procedure and the access permission procedure.

According to the present invention, the security card stores, as reference fingerprint information, a fingerprint obtained by sensing the fingerprint of a card owner via a fingerprint sensor built in the security card during new issuance, in a storage unit built in the security card, and externally transmits security information stored therein only when the identity of a fingerprint sensed by the fingerprint sensor is confirmed via a comparison between the sensed fingerprint and the reference fingerprint information, after new issuance is completed, thereby enabling only the card owner to use the security card.

The security card according to the present invention may be used as a credit card by storing financial information, including a credit card number or bank account information, and a personal identification number (PIN), and may also be used as a identification (ID) card by identifying the card owner by storing fingerprint information of the card owner as reference fingerprint information in internal memory and comparing fingerprint information sensed by the fingerprint sensor with the reference fingerprint information during each use of the security card. The security card according to the present invention may also be used as a one time password (OTP) generation card that can only be used by the card owner by generating an OTP only after the card owner is identified for financial security and outputting the generated OTP via a liquid crystal display (LCD).

According to the present invention, when the security card is used as a credit card, an ID card, and an OTP generation card, fingerprint information sensed during each use of the security card is compared with the reference fingerprint information stored in the security card, and, only when the two pieces of fingerprint information match with each other, credit card usage, access permission according to ID, and OTP generation are possible.

Referring to FIG. 1, a security processing system 100 may include a security card 110, a new issuing machine 120, and a management server 130, and may further include a card checking machine 140.

The security processing system 100 performs a new issuing step of performing a new issuing procedure of the security card 110 and a usage activation step of activating usage of the security card 110 by checking the fingerprint of a user, and further performs an access permission step in which a user of the security card 110 performs various security procedures, for example, a restricted zone entering procedure and a financial processing procedure, by checking the security card 110.

In the new issuing step, in order to enable an authentic user to newly issue his or her own security card 110, the security card 110, the new issuing machine 120, and the management server 130 interoperate with one another to perform the new issuing step.

First, in the new issuing step, a person in charge who newly issues the security card 110 receives a new issuance request via the new issuing machine 120, and, in response to the new issuance request, the management server 130 generates a first key value and transmits the security card 110 to a card-issued person, and generates a second key value and transmits the second key value to the new issuing machine 120 or an e-mail or a mobile phone of the person in charge of new issuance. Personal information, such as the name, e-mail address, and mobile phone number, of a person scheduled to be issued the security card 110 is pre-stored in a DB of the management server 130. The management server 130 extracts the e-mail address or mobile phone number of the person scheduled to be newly issued the security card 110 by browsing the DB based on personal information included in a new issuance request, and transmits the first key value to the extracted e-mail address or mobile phone number.

At this time, the management server 130 may generate time limit information including a maximum time limit for newly issuing the security card 110, and, when the management server 130 fails to receive the first key value and the second key value until a time limit corresponding to the time limit information, the management server 130 may not permit new issuance of the security card 110.

When first information is input by the user and second information is input by the person in charge of the new issuing machine 120, the new issuing machine 120 transmits the first information and the second information to the management server 130.

When the first information and the second information respectively match with the previously-generated first and second key values, and the first information and the second information are input within the time limit corresponding to the time limit information, the management server 130 generates an issued card number, matches the issued card number with a card-issued person, store a result of the matching in the DB, generates an issuance permission signal including the generated issued card number, and transmits the generated issuance permission signal to the new issuing machine 120.

When the new issuing machine 120 receives the issuance permission signal, the new issuing machine 120 transmits the issuance permission signal to the security card 110 so that pieces of security information may be stored in an internal memory of the security card 110.

The security card 110 includes a fingerprint sensor 111 which senses a fingerprint to generate fingerprint information. The security card 110 may store fingerprint information sensed by the fingerprint sensor 111 as reference fingerprint information in the memory only when the security card 110 has received the issuance permission signal via the new issuing machine 120 in the new issuing step.

Through this process, the new issuing procedure with respect to the security card 110 is completed. When the new issuing procedure is completed, the user may use the security card 110.

Other people have a risk of being issued the security card 110 and storing his or her fingerprint in the security card 110. Thus, according to the present invention, the first key value is transmitted to the e-mail or mobile phone of a card-issued person, based on the personal information included in a newly-issued person list previously stored in the DB, and the first information input by the card-issued person is compared with the first key value to thereby prevent other people from being newly issued the security card 110. Moreover, the management server 130 transmits the second key value to the new issuing machine 120 or a person in charge of new issuance, and compares the second information input by the person in charge in the new issuing step with the second key value to thereby prevent the person in charge of the new issuing machine 120 from arbitrarily issuing the security card 110 or a person other than the person in charge of the new issuing machine 120 from issuing the security card 110.

When the new issuing procedure is completed, the card-issued person may use the security card 110, and a usage activating step for properly using the security card 110 is performed. The usage activating step is performed by the security card 110.

When the card-issued person tries to enter a restricted zone or to perform a financial process by using the security card 110, the card-issued person first puts his or her finger on the fingerprint sensor 111 built in the security card 110.

The fingerprint sensor 111 of the security card 110 identifies the user of the security card 110 by sensing a fingerprint of the user and comparing the sensed fingerprint with the reference fingerprint information stored in the memory.

When the sensed fingerprint information matches with the reference information, the security card 110 controls card usage to be activated, and generates a fingerprint checking signal indicating that the fingerprint was identified.

Activation of card usage denotes externally transmitting security information stored in a memory or generating an OTP only when a card user is authenticated.

The security information includes at least one of the reference fingerprint information, an issued card number, financial information (e.g., a credit card number or bank account information), personal information of the card-issued person, a PIN, and authority information. The personal information of the card-issued person includes at least one of the name, gender, age, address, resident registration number, and mobile phone number of the card-issued person, and the authority information includes information about at least one of an accessible zone of the card-issued person and a performable work of the card-issued person.

Since card usage is activated only when the identity of the card user is confirmed via a fingerprint, the security card 110 according to the present invention may be prevented from being illegally used by other people. Since only an authentic user is able to use the security card 110, use of a credit card by other people, entry to a restricted zone by unauthorized people due to illegal card usage, and OTP generation for financial processing by other people may be prevented.

The access permission step is to process a financing procedure via the security card 110 or control entry to a restricted zone. The security card 110, the card checking machine 140, and the management server 130 interoperate with one another to perform the access permission step.

The card checking machine 140 reads security information stored in the security card 110 in order to process a financing procedure or to control entry to a restricted zone.

Although will be described later, the memory of the security card 110 is divided into a generic region storing generic information that does not matter if it is externally leaked, and a security region storing security information that needs security. The security information stored in the security region includes at least one of an issued card number, financial information (e.g., a credit card number and/or bank account information of a linked bank account), personal information of a card-issued person, a PIN, and reference fingerprint information.

The card checking machine 140 may read out the security information in a contact way via an input/output interface of an IC chip of the security card 110, or may read out the security information in a non-contact way via a radio frequency (RF) module of the security card 110. However, as described above, only when the security card 110 has been activated in the card activation step, the security card 110 may externally transmit the security information stored therein. Accordingly, only when the use of the security card 110 has been activated, the card checking machine 140 may receive the security information contained in the security card 110.

When the security information is received from the security card 110, the card checking machine 140 transmits the received security information to the management server 130, and the management server 130 identifies the user by browsing the DB based on the received security information and controls at least one of a finance processor 141, an entry open and close unit 142, and an ID processor 143 to perform a financial processing procedure or an entry control procedure.

The security card processing system and the security card processing method according to the present invention will now be described in detail.

Figure 2:
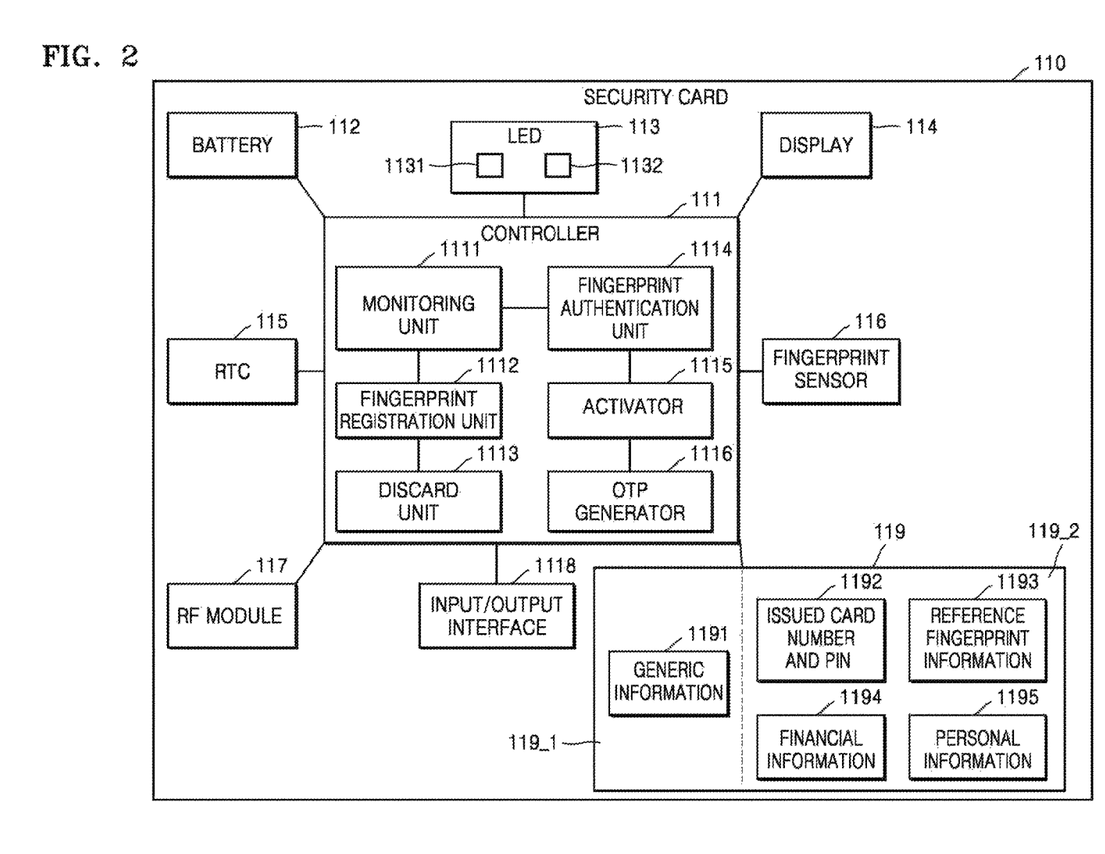
FIG. 2 is a block diagram of a security card according to the present invention.

FIG. 2 is a block diagram of a security card according to the present invention.

The security card 110 according to the present invention may include at least one of a controller 111, a battery 112, a light emitting device (LED) 113, a display 114, a real-time clock (RTC) 115, a fingerprint sensor 116, an RF module 117, an input/output interface 118, and a memory 119.

The controller 111 may be implemented using one or two central processing units (CPUs), and includes at least one of a monitoring unit 1111, a fingerprint registration unit 1112, a discard unit 1113, a fingerprint authentication unit 1114, an activator 1115, and an OTP generator 1116.

The monitoring unit 1111 performs a security function of the security card 110. A security function according to the present invention denotes two functions as follows. A first security function is to externally transmit stored security information only when fingerprint information sensed by the fingerprint sensor 116 is identical with stored reference fingerprint information, and a second security function is to monitor an access to the security information and discarding the security information when an unauthorized write access is sensed.

When a fingerprint is sensed via the fingerprint sensor 116, the monitoring unit 1111 checks whether the reference fingerprint information exists in a security region 119_2 of the memory 119. When the security region 119_2 of the memory 119 is accessed by the outside, the monitoring unit 1111 monitors whether the access is valid. If the access is not authorized, for example, when a write operation of changing the security information is sensed, the monitoring unit 1111 informs the discard unit 1113 of the unauthorized access and controls the discard unit 1113 to discard the reference fingerprint information or the security information.

When a fingerprint is sensed via the fingerprint sensor 116, the monitoring unit 1111 checks whether the reference fingerprint information exists in the security region 119_2 of the memory 119. When the reference fingerprint information does not exist, the monitoring unit 1111 allows the new issuing step of the security card 110, which will be described later, to be performed. When the reference fingerprint information exists in the security region 119_2, the monitoring unit 1111 performs a fingerprint authentication operation of comparing the reference fingerprint information with the sensed fingerprint.

The security registration unit 1112 stores, in the new issuing step, the fingerprint sensed by the fingerprint sensor 116 as the reference fingerprint information in the security region 119_2, and stores pieces of security information requiring various securities in the security region 119_2. At this time, the security registration unit 1112 stores the security information in the security region 119_2 only when the security registration unit 1112 an issuance permission signal from the new issuing machine 120. As described above, the security information includes at least one of an issued card number, financial information (e.g., a credit card number or bank account information), personal information of a card owner, a PIN, and reference fingerprint information.

The discard unit 1113 discards the security information stored in the security region 119_2, when the discard unit 1113 is informed by the monitoring unit 1111 of an illegal access to the security information stored in the security region 119_2.

The fingerprint authentication unit 1114 compares the fingerprint information sensed by the fingerprint sensor 116 with the reference fingerprint information stored in the security region 119_2 and checks whether the two pieces of information are identical with each other.

When the sensed fingerprint information is identical with the reference fingerprint information, the activator 1115 generates a fingerprint checking signal including information about whether the sensed fingerprint information is identical with the reference fingerprint information, and activates the security card 110 to transmit pieces of security information 1192 to 1195 to the outside via the input/output interface 118 or the RF module 117. At this time, the activator 1115 extracts suitable security information from the security region 119_2 according to an external request and provides the extracted security information to the input/output interface 1116 or the RF module 117 so that the extracted security information may be transmitted to the outside. For example, when the card checking machine 140 requests for an issued card number or financial information, the activator 1115 extracts an issued card number or financial information from the security region 119_2 only when fingerprint authentication is succeeded, and transmits the extracted issued card number or the extracted financial information to the card checking machine 140 via the input/output interface 1116 or the RF module 117.

When the sensed fingerprint information is not identical with the reference fingerprint information, the activator 1115 deactivates the security card 110 in order not to transmit the security information to the outside via the input/output interface 118 or the RF module 117. In this case, the fingerprint checking signal contains information representing that the sensed fingerprint information and the reference fingerprint information are different from each other. When the security card 110 is not activated since the sensed fingerprint information is not identical to the reference fingerprint information, the security information contained in the security region 119_2 is never provided to the outside, and thus people other than an authentic user may not use the security card 110.

The OTP generator 1116 generates an OTP in a financial processing work such as deposit and withdrawal, and, only when the security card 110 is activated via the activator 1115, the OTP generator 1116 generates an OTP number according to a general OTP generation procedure after checking the time via the RTC 115. The OTP number generated by the OTP generator 1116 is output via the display 114 so that the owner of the security card 110 may check the generated OTP number with his or her eyes.

The battery 112 supplies power to each of components of the security card 110 requiring power, such as the controller 111, the LED 113, the display 114, the RTC 115, the fingerprint sensor 116, and the memory 119.

The LED 113 displays successes or failures of fingerprint sensing and fingerprint authentication, and may be implemented using two LEDs to display the successes or failures, respectively. For example, when fingerprint sensing and fingerprint authentication are succeeded, a green LED 1131 may be implemented to flicker. When fingerprint sensing and fingerprint authentication is failed, a red LED 1132 may be implemented to flicker.

The fingerprint sensor 116 senses a fingerprint and generates fingerprint information. The sensed fingerprint information is provided to the controller 111. During new issuance, sensed fingerprint information is stored as reference fingerprint information in the memory 119. After new issuance is completed, sensed fingerprint information is used to be compared with the reference fingerprint information for fingerprint authentication.

The RF module 117 transmits the security information stored in the memory 119 to the outside in a non-contact way. The security information stored in the memory 119 may be transmitted to the outside only when fingerprint authentication in the controller 111 is succeeded.

The input/output interface 118 is a passage via which information is transmitted and received to and from the outside, and is implemented as an ISO pad that is used in general credit cards including IC chips. Similar to the RF module 117, the input/output interface 118 may transmit the security information to the outside only when fingerprint authentication in the controller 111 is succeeded.

The memory 119 is a space for storing various types of information, and is divided into a generic region 1191_1 not requiring security, and a security region 1191_2 absolutely requiring security. The generic region 1191_1 stores pieces of generic information having no specific formats, and the security region 1191_2 stores an issued card number and PIN 1192, reference fingerprint information 1193, financial information 1194 (e.g., a credit card number or a bank account number), and personal information 1195 of a card-issued person, which should not be exposed.

Figure 3:
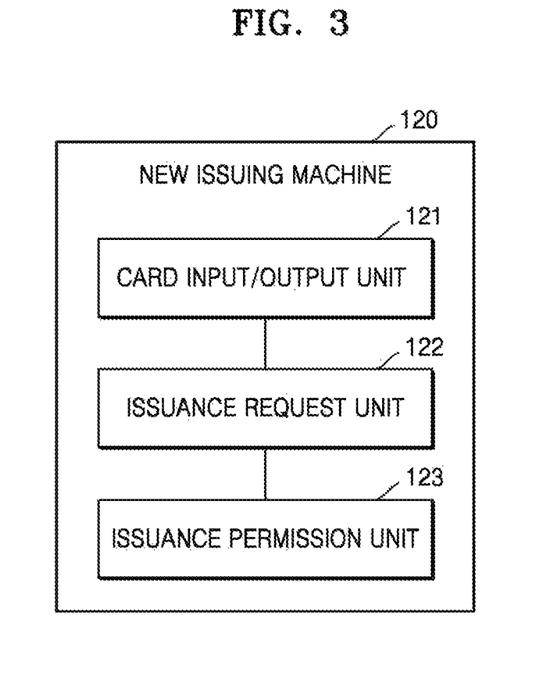
FIG. 3 is a block diagram of a new issuing machine according to the present invention.

FIG. 3 is a block diagram of a new issuing machine according to the present invention.

The new issuing machine 120 is used to newly issue the security card 110, and a person in charge of the new issuing machine 120 performs a new issuing procedure of the security card 110 by inputting various pieces of information to the security card 110 via the new issuing machine 120.

The new issuing machine 120 is connected to the management server 130 via communication to exchange information with the management server 130. When the new issuing machine 120 receives an issuance permission signal from the management server 130, the new issuing machine 120 completes the new issuing procedure of the security card 110 by transmitting the issuance permission signal to the security card 110.

To this end, the new issuing machine 12 includes a card input/output unit 121, an issuance request unit 122, and an issuance permission unit 123.

The card input/output unit 121 is connected to the input/output interface 118 or the RF module 117 of the security card 110 so that pieces of security information may be stored in the security region 119_2 of the security card 110.

The issuance request unit 122 transmits new issuance information including the personal information of a card-issued person of the security card 110 to the management server 130 during new issuance of the security card 110, and receives issuance security information for issuing the security card 110 and transmits the received issuance security information to the management server 130.

The issuance request unit 122 receives a first key value and time limit information from the management server 130 after transmitting the new issuance information to the management server 130. The person in charge of the new issuing machine 120 needs to check the first key value and the time limit information and then input first information corresponding to the first key value within a time limit corresponding to the time limit information via various input devices. The issuance request unit 122 receives second information corresponding to a second key value from the owner of the security card 110.

The issuance request unit 122 generates issuance security information including the first information input by the person in charge and the second information input by the owner of the security card 110, and transmits the generated issuance security information to the management server 130.

The issuance permission unit 123 receives the issuance permission signal from the management server 130 and transmits the received issuance permission signal to the security card 110 so that the security information may be stored in the security region 119_2 of the security card 110.

When the issuance permission unit 123 receives an issuance completion signal from the management server 130 after issuance of the security card 110 is completed, the issuance permission unit 123 transmits the received issuance completion signal to the security card 110 so that a security function on the security card 110 may start later.

Figure 4:
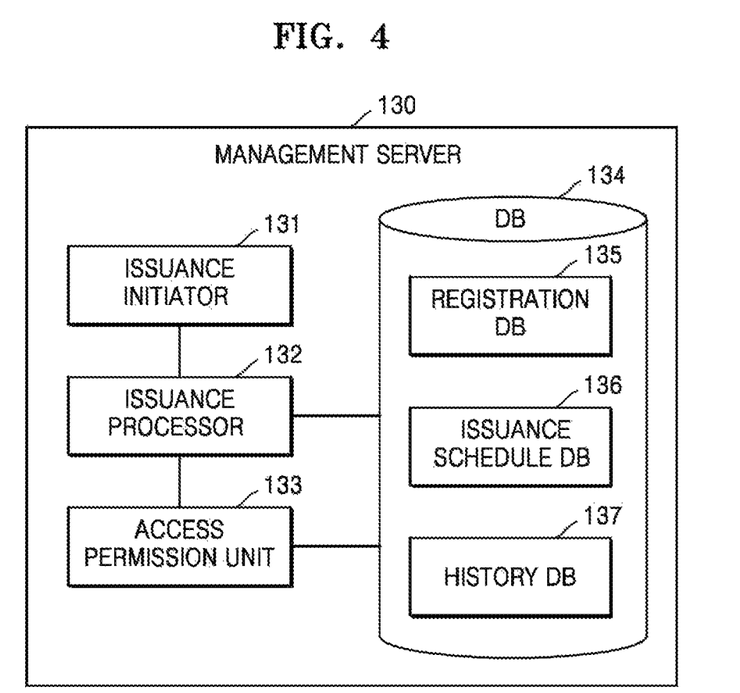
FIG. 4 is a block diagram of a management server according to the present invention.

FIG. 4 is a block diagram of a management server according to the present invention.

The management server 130 is connected to the new issuing machine 120 and the card checking machine 140 via communication to exchange various types of information with the new issuing machine 120 and the card checking machine 140, and processes new issuance of the security card 110 and access permission via the security card 110. To this end, the management server 130 includes an issuance initiator 131, an issuance processor 132, an access permission unit 133, and a DB 134.

The issuance initiator 131 is involved in new issuance of the security card 110. When the issuance initiator 131 receives the new issuance information from the new issuing machine 120, the issuance initiator 131 generates and transmits the first key value to the new issuing machine 120. The issuance initiator 131 checks the personal information of the card-issued person from an issuance schedule DB 136 and transmits the second key value in an e-mail or text message form to the card-issued person of the security card 110. The issuance initiator 131 may generate time limit information representing a time limit within which the first key value and the second key value should be input, and transmit the time limit information together with the first key value and the second key value.

Then, the issuance processor 132 receives the issuance security information including the first information input by the person in charge and the second information input by the owner of the security card 110 from the new issuing machine 120, and checks whether the first information and the second information are respectively identical to the first key value and the second key value and whether the first information and the second information have been received within the time limit corresponding to the time limit information.

When the first information and the second information was received within the time limit corresponding to the time limit information and the first information and the second information are respectively identical to the first key value and the second key value, the issuance processor 132 generates an issued card number and an issuance permission signal including the generated issued card number and transmits the generated issued card number and the generated issuance permission signal to the new issuing machine 120.

Thereafter, when the issuance processor 132 receives the reference fingerprint information from the new issuing machine 120, the issuance processor 132 stores the reference fingerprint information in the DB and then generates a issuance completion signal indicating a completion of an issuance procedure of the security card 110 and transmits the generated issuance completion signal to the new issuing machine 120.

When the owner of the security card 110 tries to perform various security procedures using the security card 110, the access permission unit 133 determines whether the owner could perform the various security procedures by using the security card. For example, the owner of the security card 110 may try to perform an entry to a restricted zone or a finance processing work.

In this case, the access permission unit 133 receives the security information from the card checking machine 140, and determines whether the security card 110 is legal for a security procedure by referring to the DB 134.

The DB 134 stores various types of information about the security card 110 and personal information about a user, and includes a registration DB 135, the issuance schedule DB 136, and a history DB 137.

The registration DB 135 stores an issued card number of the newly-issued security card 110, the reference fingerprint information, and the personal information of the card-issued person, and also stores an accessible zone via each security card 110 or a work that may be performed via each security card 110.

The access permission unit 133 determines whether the owner of a security card is a legal person for a corresponding procedure, by browsing the registration DB 135 by using a card number received from the card checking machine 140, and then generates an access permission signal including information regarding access permission or access non-permission and transmits the generated access permission signal to the card checking machine 140.

The issuance schedule DB 136 stores personal information of a person scheduled to be newly issued the security card 110, and information about a security step. When the issuance initiator 131 receives the new issuance information including the personal information of the card-issued person of the security card 110, the issuance initiator 131 browses the issuance schedule DB 136 by using the personal information included in the new issuance information and transmits the second key value to the card-issued person of the security card 110.

The history DB 137 stores an issuance history of each security card via the new issuing machine 120 and access and work histories of each security card 110 with respect to the card checking machine 140.

Figure 5:
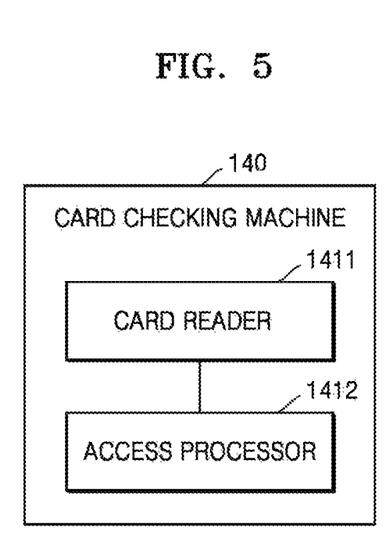
FIG. 5 is a block diagram of a card checking machine according to the present invention.

FIG. 5 is a block diagram of a card checking machine according to the present invention.

The card checking machine 140 reads the security information stored in the security card 110 in a contact or non-contact way, and transmits a read card number to the management server 130 and receives an access permission signal for the read card number, thereby controlling a subsequent security operation to be performed when the card-issued person of the security card 110 is authorized for each security procedure.

To this end, the card checking machine 140 includes a card reader 1411 and an access processor 1412, and is connected to the management server 130 via communication and is also connected to at least one of a finance processor 141, an entry open and close unit 142, and an ID processor 143 via communication.

The card reader 1411 reads the security information and the fingerprint checking signal from the security card 110 in a contact or non-contact way, and transmits the read security information and the read fingerprint checking signal to the management server 130.

As described above, the security card 110 may generate the fingerprint checking signal only when the fingerprint of the card owner is identified, and may transmit the security information to the outside. Thus, the card reader 1411 may be implemented to read a card number only when the fingerprint checking signal is received from the security card 110.

When the access permission unit 1412 receives the access permission signal from the management server 130, the access permission unit 1412 controls the owner of the security card 100 to have an access to a corresponding security procedure, according to the access permission signal.

Since the access permission unit 1412 is connected to at least one of the finance processor 141, the entry open and close unit 142, and the ID processor 143 via communication, only when an access permission signal representing an access permission is received, the access permission unit 1412 allows the owner of the security card 110 to perform operations, such as a corresponding financing work, entry to a corresponding zone, and identification. If an access permission signal representing access non-permission is received, the access permission unit 1412 controls the owner of the security card 110 to not perform a corresponding work.

The security card processing method according to the present invention will now be described in detail. Since the security card processing method according to the present invention is basically the same as the security card processing system according to the present invention, a detailed description thereof and a repeated description thereof will be omitted herein.

Figure 6:
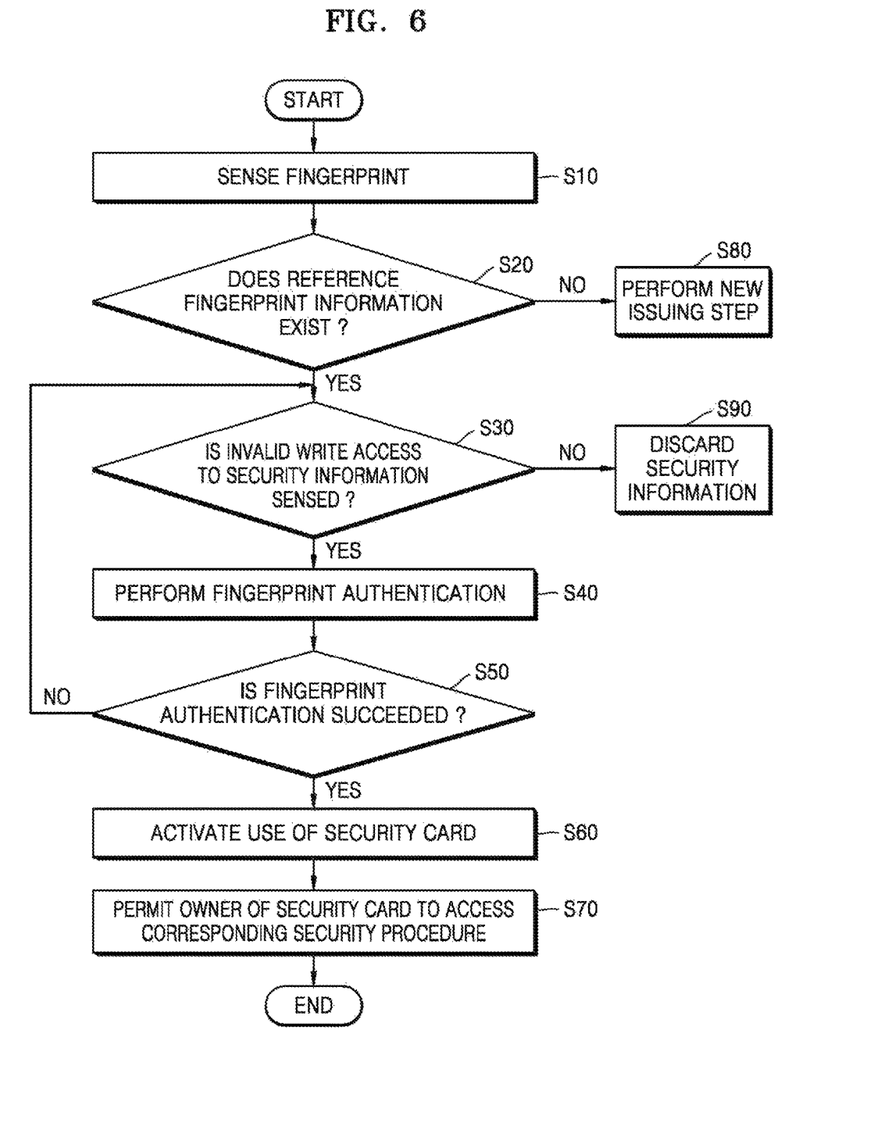
FIG. 6 is a flowchart of a security card processing method according to the present invention.

FIG. 6 is a flowchart of the security card processing method according to the present invention.

First, when the owner of the security card 110 puts his or her fingerprint on the fingerprint sensor 116 of the security card 110, the fingerprint sensor 116 senses the fingerprint and generates fingerprint information.

In operation S20, the controller 111 of the security card 110 determines whether reference fingerprint information exists in the memory 119. When no reference fingerprint information exists in the memory 119, a new issuing step is performed, in operation S80.

When the reference fingerprint information exists in the memory 119, a use activating step and an access permission step with respect to the security card 110 are performed.

When an invalid write access to the security information stored in the security region 119_2 of the memory 119 is sensed in operation S30, the controller 111 of the security card 110 prevents future illegal accesses to the security information stored in the security region 119_2, by discarding the security information.

On the other hand, when the reference fingerprint information exists in the memory 119 and a valid read access to the security information stored in the security region 119_2 of the memory 119 is sensed, the controller 111 of the security card 110 performs a fingerprint authentication operation of comparing fingerprint information sensed by the fingerprint sensor with the reference fingerprint information, in operation S40.

When fingerprint authentication is succeeded since the reference fingerprint information is identical with the sensed fingerprint information, the controller 111 of the security card 110 generates a fingerprint checking signal and activates use of the security card 110 and controls the security information stored in the security card 110 to be transmitted to the external card checking machine 140 according to an external request, in operation S60. The security information is transmitted to the management server 130 via the card checking machine 140, and the management server 130 generates an access permission signal including information about whether the owner of the security card 110 has access to a corresponding security procedure, by using the issued card number included in the security information, and transmits the generated access permission signal to the card checking machine 140.

In response to the access permission signal, the card checking machine 140 performs an operation according to whether the owner of the security card 110 is permitted to access a corresponding security procedure, in operation S70.

Figure 7:
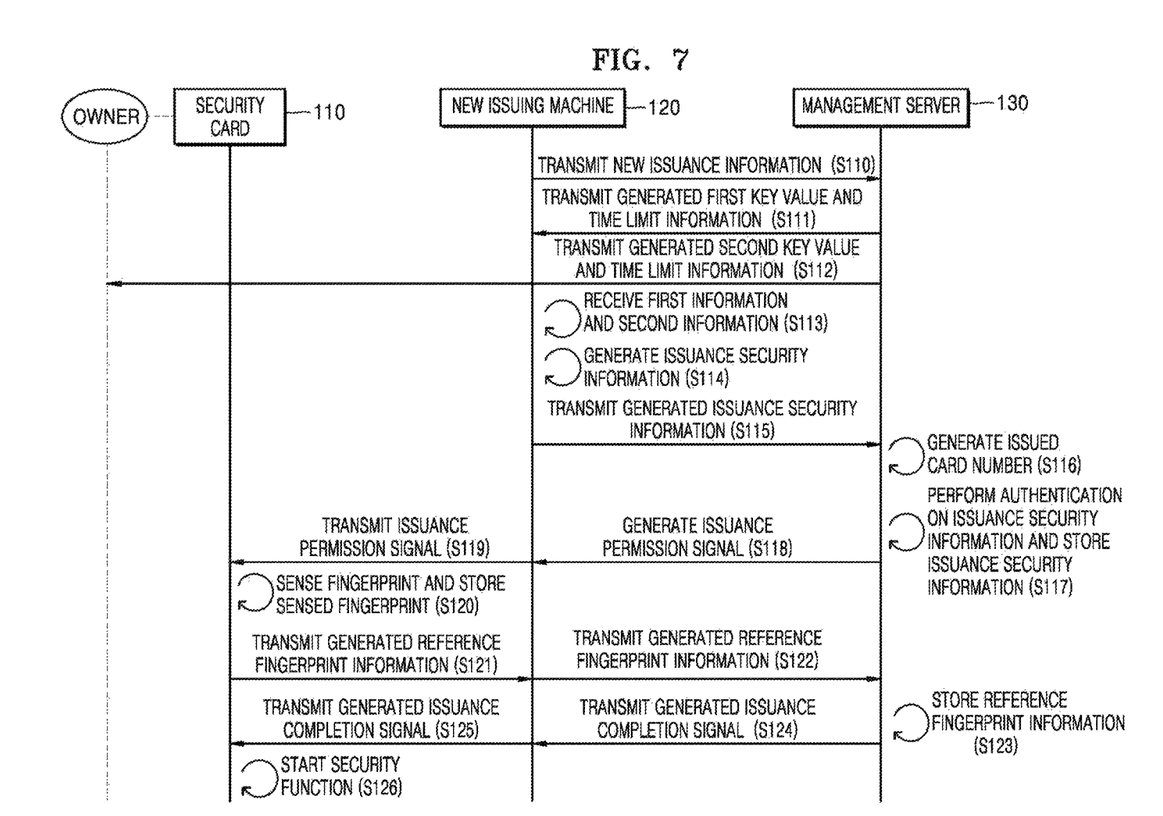
FIG. 7 is a flowchart of a new issuing step of a security card.

FIG. 7 is a flowchart of a new issuing step of a security card.

First, in operation S110, the new issuing machine 120 transmits new issuance information including the personal information of a card-issued person of the security card 110 to the management server 130 during new issuance of the security card 110.

In response to the new issuance information, the management server 130 generates a first key value and transmits the generated first key value to the new issuing machine 120 or a person in charge of new issuance, in operation S111, and generates a second key value and transmits the generated second key value in an e-mail or text message form to the card-issued person of the security card 110, in operation S112. The management server 130 may generate time limit information together with the first key value and the second key value and may transmit the generated time limit information to the new issuing machine 120 and the card-issued person of the security card 110.

In operation S113, the new issuing machine 120 receives first information corresponding to the first key value and second information corresponding to the second key value from the person in charge of new issuance and the card-issued person of the security card 110, respectively. The new issuing machine 120 may also receive authority information associated with the card-issued person of the security card 110 from the person in charge of new issuance. The authority information includes information about at least one of an accessible zone of a card-issued person and a performable work of the card-issued person.

The new issuing machine generates issuance security information including the received first information and the received second information in operation S114, and transmits the generated issuance security information to the management server 130, in operation S115. The issuance security information may further include the authority information of the card-issued person.

When the issuance security information is received, the management server 130 performs authentication by comparing the previously-generated first and second key values with the first and second information, respectively, in operation S116. When the previously-generated first and second key values are identical with the first and second information, respectively, and thus the authentication is succeeded, the management server 130 generates an issued card number, in operation S117. Although not shown in the drawings, when the issued card number is generated, the issued card number and the personal information of the card-issued person are stored in the DB 134. When the authority information is included in the issuance security information, the authority information is also stored.

Then, the management server 130 generates an issuance permission signal including the issued card number and transmits the issuance permission signal to the new issuing machine 120, in operation S118. The issuance permission signal transmitted to the new issuing machine 120 is transmitted to the security card 110 connected to the new issuing machine 120, in operation S119.

In response to the issuance permission signal, the security card 110 stores fingerprint information sensed via the fingerprint sensor as reference fingerprint information in the security region 119_2 of the memory 119, in operation S120.

The generated reference fingerprint information is transmitted to the new issuing machine 120 and the management server 130, in operations S121 and S122. The management server 130 stores the reference fingerprint information in the DB 134, in operation S123.

Then, the management server 130 generates an issuance completion signal representing that new issuance of the security card 110 has been completed, and transmits the generated issuance completion signal to the new issuing machine 120, in operation S125. The issuance completion signal is transmitted to the security card 110 via the new issuing machine 120, in operation S126.

In response to the issuance completion signal, the security card 110 starts a security function of monitoring an access to the security region 119_2 of the memory 119, in operation S126.

Figure 8:
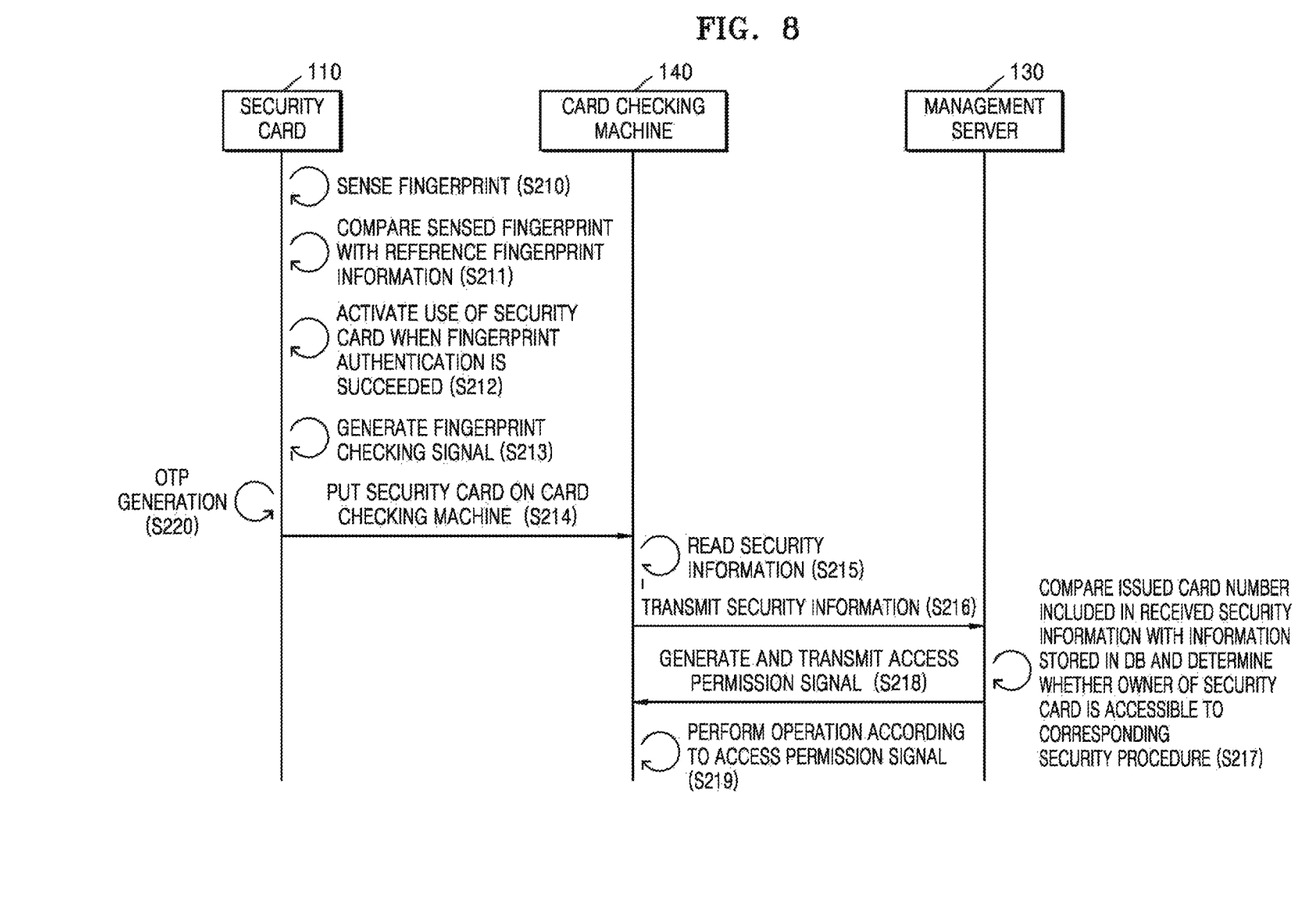
FIG. 8 is a flowchart of a usage activation step and an access permission step of a security card.

FIG. 8 is a flowchart of a usage activation step and an access permission step of a security card.

First, the security card 110 senses a fingerprint via the fingerprint sensor, in operation S210, and performs a fingerprint authentication procedure of comparing the sensed fingerprint with the reference fingerprint information, in operation S211.

The security card 110 activates use of the security card 110 when fingerprint authentication is succeeded, in operation S212, and generates a fingerprint checking signal representing that fingerprint authentication has been succeeded.

Then, when a card owner puts the security card 110 on the card checking machine 140 or approaches the security card 110 to the card checking machine 140, in operation S214, the card checking machine 140 reads the security information from the security card 110, in operation S215.

As described above, the security card 110 may externally transmit the security information stored in the security region 119_2 only when fingerprint authentication is succeeded. When fingerprint authentication is failed, the security card 110 blocks an access to the security information and does not transmit the security information to the outside. Accordingly, when fingerprint authentication is failed, the card checking machine 140 cannot read any information of the security information from the security card 110.

The card checking machine 140 transmits the security information read from the security card 110 to the management server 130, in operation S216. The management server 130 compares the issued card number included in the received security information with information stored in the DB 134, and determines whether the owner of the security card 110 is accessible to a corresponding security procedure, in operation S217.

Then, the management server 130 generates an access permission signal including information about whether the owner of the security card 110 is accessible to the corresponding security procedure, and transmits the generated access permission signal to the card checking machine 140, in operation S218.

The card checking machine 140 performs a security procedure with respect to the security card 110 by performing an operation according to the access permission signal, in operation S219.

When generation of an OTP number is selected by the owner of the security card 110 after operations S212 and S213 are performed, the security card 110 generates an OTP number for a financial work. When fingerprint authentication is failed, the security card 110 fails to generate an OTP number for a financial work.

Figure 9:
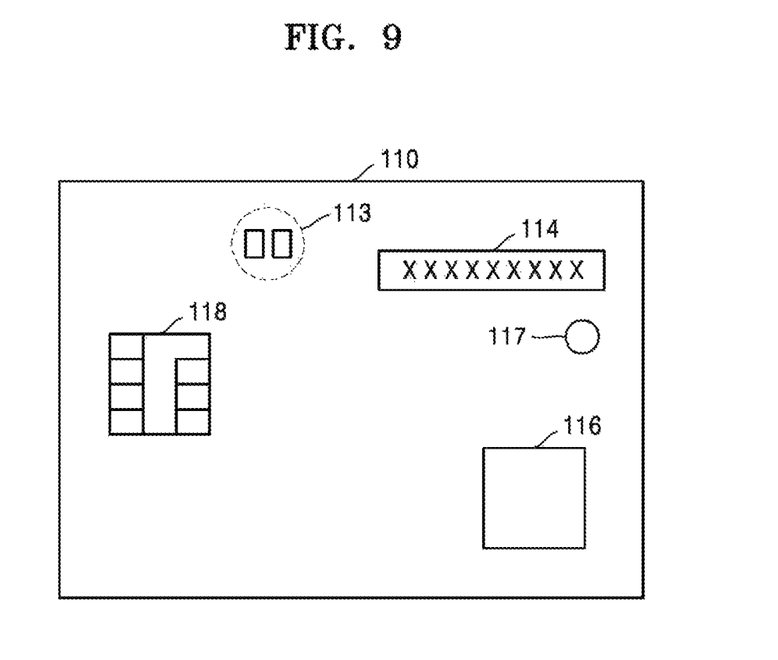
FIG. 9 is a block diagram of a security card according to the present invention.

FIG. 9 is a block diagram of a security card according to the present invention.

Referring to FIG. 9, the security card 110 according to the present invention includes an LED 113 having a similar size to a generally-used credit card and informing a success or a failure of fingerprint recognition on a front side thereof, a display 114 outputting an OTP number for a financial work, a fingerprint sensor 116 reading a fingerprint of the owner of the security card 110, an OTP generation button 117 for starting generation of an OTP number by a selection of a user when fingerprint authentication is succeeded, and an ISO pad 118 capable of externally transmitting security information in a contact way.

Sizes of the components of the security card 110 of FIG. 9 and an arrangement of the components are exemplary, and thus each component may have any of various sizes and may be disposed at any of various locations.

The above-described method according to the present invention can be embodied as computer readable codes on a computer readable recording medium. The computer readable recording medium is any type of recording device that stores data which can thereafter be read by a computer system. Examples of the computer-readable recording medium include ROM, RAM, CD-ROMs, magnetic tapes, floppy discs, and optical data storage media. The computer readable recording medium can also be distributed over network coupled computer systems so that the computer readable code is stored and executed in a distributive manner.

While the present invention has been particularly shown and described with reference to exemplary embodiments thereof, it will be understood that various changes in form and details may be made therein without departing from the spirit and scope of the following claims.

The invention claimed is:

1. A method for operating a security card, the method comprising:
   providing a security card that performs fingerprint authentication;
   providing a new issuing machine that communicates with the security card; and
   providing a management server that communicates with the new issuing machine,
   sensing, via the security card, a fingerprint and generating sensed fingerprint information;
   receiving, via the new issuing machine, new issuance information including personal information of a card-issued person and transmitting the received new issuance information to the management server,
   in response to the new issuance information received:
   generating and transmitting, via the management server, a first key value and a first key value time limit information to the new issuing machine, and
   generating and transmitting, via the management server, a second key value and a second key value time limit information to a card-issued person of the security card in an e-mail or text message format,
   receiving, via the new issuing machine, issuance security information including first information and second information and transmitting the issuance security information to the management server,
   in response to the first information and the second information included in the issuance security information being identical to the first key value and the second key value and in response to the first information and the second information being received within the first key value time limit information and the second key value time limit information:
   transmitting, via the management server, an issuance permission signal to the new issuing machine;
   transmitting, via the new issuing machine, the issuance permission signal received to the security card;
   in response to the issuance permission signal received, storing, via the security card, the sensed fingerprint information as a reference fingerprint information in a security region of the security card, and further storing security information including at least two of financial information for financial works, personal information, a personal identification number (PIN), and authority information in the security region of the security card;
   transmitting, via the security card, the reference fingerprint information to the management server;
   generating, via the management server, an issuance completion signal to the new issuing machine when receiving the reference fingerprint information;
   transmitting, via the new issuing machine, the issuance completion signal received to the security card;
   starting, via the security card, monitoring the security region of the security card;
   providing, via the security card, the security information stored in the security region to the outside via an input/output interface or a radio frequency (RF) module only when new sensed fingerprint information is identical to the reference fingerprint information via a controller;

generating, via the security card, a one-time password (OTP) which is output via a display for a financial work when the security card is activated and an OTP generation button is pressed; and discarding, via the security card, the reference fingerprint information stored in the security region when a change in the security region is sensed.

2. The method of claim 1 further comprising:

reading, via a card checking machine, the security information stored in the security region;

transmitting, via the card checking machine, the read security information to the management server; and performing, via the card checking machine, an operation according to an access permission signal about access permission or access non-permission when the access permission signal is received from the management server, wherein the card checking machine communicates with the security card and the management server.

3. The method of claim 1, further comprising:

sensing, via the controller, a change in the security information stored in the security region; and discarding, via the controller, the security information stored in the security region when the change in the security information stored in the security region is sensed.

4. A security card processing system comprising:

a security card that performs fingerprint authentication;

a new issuing machine that communicates with the security card; and a management server that communicates with the new issuing machine, wherein the security card:
  senses a fingerprint and generates sensed fingerprint information;
  stores reference fingerprint information in a security region and further stores security information including at least two of financial information for financial works, personal information, a personal identification number (PIN), and authority information in the security region of the security card;
  provides the security information stored in the security region to the outside via an input/output interface or a radio frequency (RF) module only when the sensed fingerprint information is identical to the reference fingerprint information via a controller; and
  generates a one-time password (OTP) which is output via a display for a financial work when the security card is activated and an OTP generation button is pressed, wherein the new issuing machine:
  receives new issuance information including personal information of a card-issued person and transmits the received new issuance information to the management server,
  receives issuance security information including first information corresponding to a first key value and second information corresponding to a second key value and transmits the issuance security information to the management server, and
  transmits an issuance permission signal and an issuance completion signal to the security card when receiving the issuance permission signal and the issuance completion signal from the management server, wherein, in response to receiving the issuance permission signal, the security card:
  stores a fingerprint sensed via a fingerprint sensor as the reference fingerprint information in the security region of the security card, and
  transmits the reference fingerprint information to the management server via the new issuing machine, and in response to the issuance completion signal received, the security card
  starts monitoring the security region, and
  discards the reference fingerprint information stored in the security region when a change in the security region is sensed, and wherein, in response to receiving the new issuance information, the management server:
  generates and transmits the first key value and a first key value time limit information to the new issuing machine, and
  generates and transmits the second key value and a second key value time limit information to a card-issued person of the security card in an e-mail or text message format, and, wherein when the first information and the second information included in the issuance security information are identical to the first key value and the second key value and in response to the first information and the second information being received within the first key value time limit information and the second key value time limit information, the management server:
  transmits the issuance permission signal,
  generates the issuance completion signal when receiving the reference fingerprint information, and
  transmits the issuance completion signal to the new issuing machine.

5. The security card processing system of claim 4, further comprising a card checking machine that communicates with the security card and the management server, wherein the card checking machine:
  reads the security information stored in the security region,
  transmits the read security information to the management server, and
  performs an operation according to an access permission signal about access permission or access non-permission when the access permission signal is received from the management server.

* * * * *